(12) United States Patent
Fouquet et al.

(10) Patent No.: US 7,720,264 B2
(45) Date of Patent: *May 18, 2010

(54) METHOD AND SYSTEM FOR PUPIL DETECTION FOR SECURITY APPLICATIONS

(75) Inventors: Julie E. Fouquet, Portola Valley, CA (US); Richard E. Haven, Sunnyvale, CA (US); Scott W. Corzine, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1375 days.

This patent is subject to a terminal disclaimer.

(21) Appl. No.: 10/843,512

(22) Filed: May 10, 2004

(65) Prior Publication Data

US 2005/0249384 A1 Nov. 10, 2005

(51) Int. Cl.
*G06K 9/00* (2006.01)

(52) U.S. Cl. .................. 382/117; 382/218; 382/275; 382/103; 382/170

(58) Field of Classification Search ............ 382/117, 382/218, 275, 103, 170
See application file for complete search history.

(56) References Cited

U.S. PATENT DOCUMENTS

| 3,795,444 | A | 3/1974 | Glidden et al. |
| 5,016,282 | A | 5/1991 | Tomono et al. |
| 5,204,703 | A | 4/1993 | Hutchinson et al. |
| 5,359,669 | A | 10/1994 | Shanley et al. |
| 5,422,690 | A | 6/1995 | Rothberg et al. |
| 5,598,145 | A | 1/1997 | Shimotani et al. |
| 5,905,563 | A | 5/1999 | Yamamoto |
| 5,912,721 | A | 6/1999 | Yamaguchi et al. |
| 6,082,858 | A * | 7/2000 | Grace et al. ............... 351/200 |
| 6,353,494 | B1 | 3/2002 | Hamada |
| 6,447,119 | B1 * | 9/2002 | Stewart et al. ............ 351/212 |
| 6,616,277 | B1 | 9/2003 | Davenport |
| 6,714,665 | B1 | 3/2004 | Hanna et al. |
| 6,717,518 | B1 | 4/2004 | Pirim et al. |
| 6,734,911 | B1 | 5/2004 | Lyons |
| 2002/0051116 | A1 | 5/2002 | Van Saarloos et al. |
| 2003/0012413 | A1 | 1/2003 | Kusakari et al. |
| 2003/0118217 | A1 | 6/2003 | Kondo et al. |
| 2004/0047030 | A1 * | 3/2004 | MacAulay ............... 359/368 |

(Continued)

FOREIGN PATENT DOCUMENTS

DE 4441332 5/1995

(Continued)

OTHER PUBLICATIONS

Ebisawa, Yoshinobu and Shin-ichi Satoh. "Effectiveness of Pupil Area Detection Technique using Two Light Sources and Image Difference Method". Proceedings of the 15th Annual International Conference of the IEEE Engineering in Medicine and Biology Society: 1993. vol. 15. pp. 1268-1269.*

(Continued)

*Primary Examiner*—Matthew C Bella
*Assistant Examiner*—Mike Rahmjoo

(57) ABSTRACT

An object to be detected is illuminated by a single broadband light source or multiple light sources emitting light at different wavelengths. The light is captured by an imager, which includes a light-detecting sensor covered by a hybrid filter.

22 Claims, 10 Drawing Sheets

U.S. PATENT DOCUMENTS

| | | |
|---|---|---|
| 2004/0095645 A1* | 5/2004 | Pellicori et al. ............. 359/584 |
| 2004/0170304 A1* | 9/2004 | Haven et al. ................ 382/115 |
| 2005/0093437 A1* | 5/2005 | Ouyang ...................... 313/506 |
| 2005/0175218 A1 | 8/2005 | Vertegaal et al. |
| 2005/0195277 A1 | 9/2005 | Yamasaki |
| 2006/0046163 A1* | 3/2006 | Broer et al. .................... 430/7 |

FOREIGN PATENT DOCUMENTS

| | | |
|---|---|---|
| DE | 19719695 | 11/1998 |
| WO | WO 2004/005073 | 1/2004 |

OTHER PUBLICATIONS

Rowell, Erica "Turned on and Jacked in", ABCNews.com article; http://abcnews.go.com/sections/tech/cuttingedge/cuttingedge000901.html, (Nov. 4, 2002),.

Zhai, et al., "Manual and Gaze Input Cascaded (Magic) Pointing", IBM Almaden Research Center, (May 1999),.

Ebisawa, Yoshinobu et al., "Effectiveness of Pupil Area Detection Technique using Two Light Sources and Image Difference Method", Proceedings of the 15th Annual International Conference of the IEEE Engineering in Medicine and Biology Society; vol. 15., (1993), 1268-1269.

Ebisawa, Yoshinobu "Unconstrained Pupil Detection Technique using Two Light Sources and the Image Difference Mehtod", Visualization and Intelligent Design in Engineering and Architecture, (1995), 79-89.

* cited by examiner

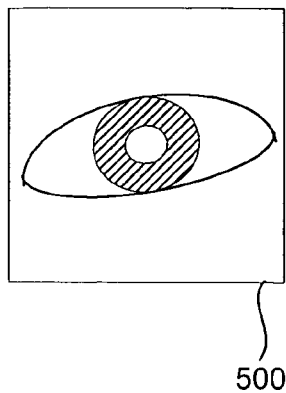
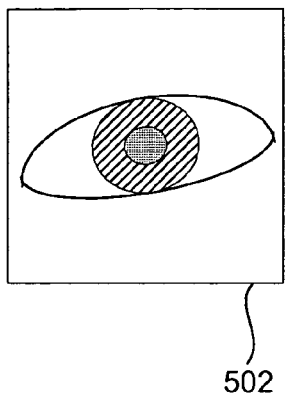
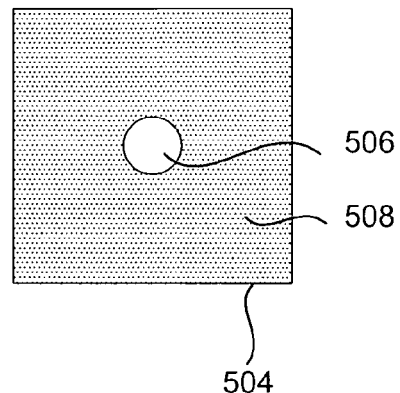
FIG. 5a  FIG. 5b  FIG. 5c
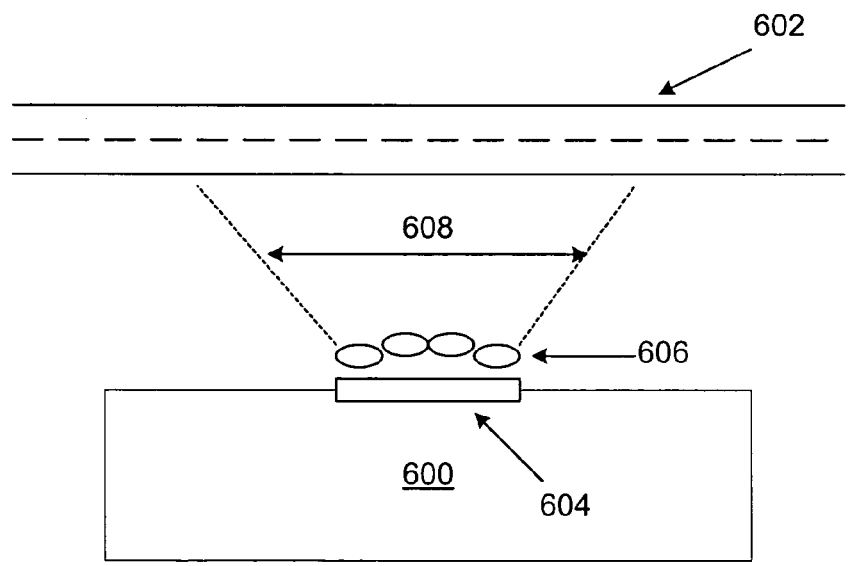
FIG. 6

METHOD AND SYSTEM FOR PUPIL DETECTION FOR SECURITY APPLICATIONS

BACKGROUND

There are a number of applications in which it is of interest to detect or image an object. The object may be imaged or detected in daylight and/or in darkness, depending on the application. Examples of such applications include, but are not limited to, personal safety and security.

Security applications typically use motion detectors to trigger alarms, bright floodlights, or video cameras when a sufficiently heavy or warm mass moves within their range. Motion detectors are used, for example, in home security systems and commercial security settings. Unfortunately, motion detectors do not always discriminate between human, animal, and inanimate objects. Thus, a large object, such as a dog or a truck, that moves near a motion detector may be detected and unnecessarily create a false positive by triggering an alarm, floodlight, or video camera. False positives result in extra costs for the individuals, businesses, and police departments that are required to respond to all triggered events.

SUMMARY

In accordance with the invention, a method and system for pupil detection are provided. An object to be imaged or detected is illuminated by a single broadband light source or multiple light sources emitting light at different wavelengths. The light is received by a receiving module, which includes a light-detecting sensor and a hybrid filter. The hybrid filter includes a multi-band narrowband filter and a patterned filter layer. One or more images captured by the sensor are analyzed to determine if one or both pupils are detected. When a pupil (or pupils) is detected, an alert signal is generated. The alert signal may trigger, for example, an alarm system, floodlights, or video cameras. Pupil detection may be used independently or in combination with other features in a security system, such as, for example, motion detectors.

BRIEF DESCRIPTION OF THE DRAWINGS

The invention will best be understood by reference to the following detailed description of embodiments in accordance with the invention when read in conjunction with the accompanying drawings, wherein:

FIG. 5*a* illustrates an image generated with an on-axis light source in accordance with the embodiment of FIG. 3;

FIG. 5*b* depicts an image generated with an off-axis light source in accordance with the embodiment of FIG. 3;

FIG. 5*c* illustrates an image resulting from the difference between the FIG. 5*a* image and the FIG. 5*b* image;

FIG. 6 is a diagram of a third application that utilizes pupil detection in an embodiment in accordance with the invention;

DETAILED DESCRIPTION

The following description is presented to enable one skilled in the art to make and use the invention, and is provided in the context of a patent application and its requirements. Various modifications to the disclosed embodiments will be readily apparent to those skilled in the art, and the generic principles herein may be applied to other embodiments. Thus, the invention is not intended to be limited to the embodiments shown, but is to be accorded the widest scope consistent with the appended claims and with the principles and features described herein. It should be understood that the drawings referred to in this description are not drawn to scale.

Embodiments in accordance with the invention described herein utilize wavelength-dependent imaging for security applications. Wavelength-dependent imaging is a technique for detecting an object, and typically involves detecting one or more particular wavelengths that reflect off the object. In some applications, only solar or ambient illumination is required, while in other applications other or additional illumination is needed.

Figure 1:
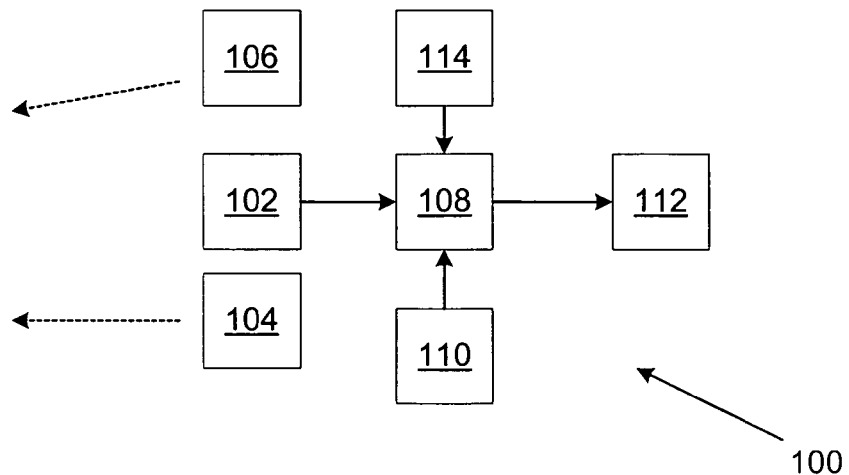
FIG. 1 is a block diagram of a system for pupil detection in an embodiment in accordance with the invention.

With reference now to the figures and in particular with reference to FIG. 1, there is shown a block diagram of a system for pupil detection in an embodiment in accordance with the invention. The system 100 includes an imager 102 and two light sources 104, 106. In this embodiment for pupil detection, two images of a subject's face and/or eyes (not shown) are captured using imager 102. One of the images is taken using light source 104, while the second image is taken using light source 106. Light sources 104, 106 are shown on opposite sides of imager 102 in the FIG. 1 embodiment. In other embodiments in accordance with the invention, light sources 104, 106 may be located on the same side of imager 102.

Light sources 104, 106 emit light at different wavelengths that produce substantially equal image intensity (brightness) in this embodiment in accordance with the invention. Light sources 104, 106 are implemented as light-emitting diodes (LEDs) or multi-mode semiconductor lasers having infrared or near-infrared wavelengths in this embodiment, and each light source 104, 106 may be implemented as one, or multiple, sources. In other embodiments in accordance with the invention, light sources 104, 106 may also be replaced by a single broadband light source emitting light at two or more different wavelengths, such as the sun, for example.

Imager 102 is positioned to receive light reflected from the eye or eyes of the subject (not shown). Even though light sources 104, 106 can be at any wavelength, the wavelengths selected in the FIG. 1 embodiment are chosen so that the light will not distract the subject and the iris of the eye will not contract in response to the light. The selected wavelengths are typically in a range that imager 102 can detect.

System 100 further includes controller 108, which may be dedicated to system 100 or may be a shared device. Frames of image information are generated by the imager 102 and then processed and analyzed by controller 108 to distinguish a pupil (or pupils) from other features within the field of view of imager 102. Controller 108 is connected to timer 110. Timer 110 represents any known device or technique that enables controller 108 to make time-based determinations.

Controlled device 112 receives an alert signal from controller 108. The alert signal is generated when controller 108 detects the pupil or pupils of a subject. Controlled device 112 may be implemented, for example, as an alarm or one or more floodlights or video cameras.

Input device 114 may be used to input or alter various parameters associated with controller 108. For example, a user may want system 100 to capture a certain number of images within a particular time period or verify pupil detection prior to generating an alert signal. Input device 114 may be implemented, for example, as a computer or a control panel operating pursuant to a security program.

Figure 2:
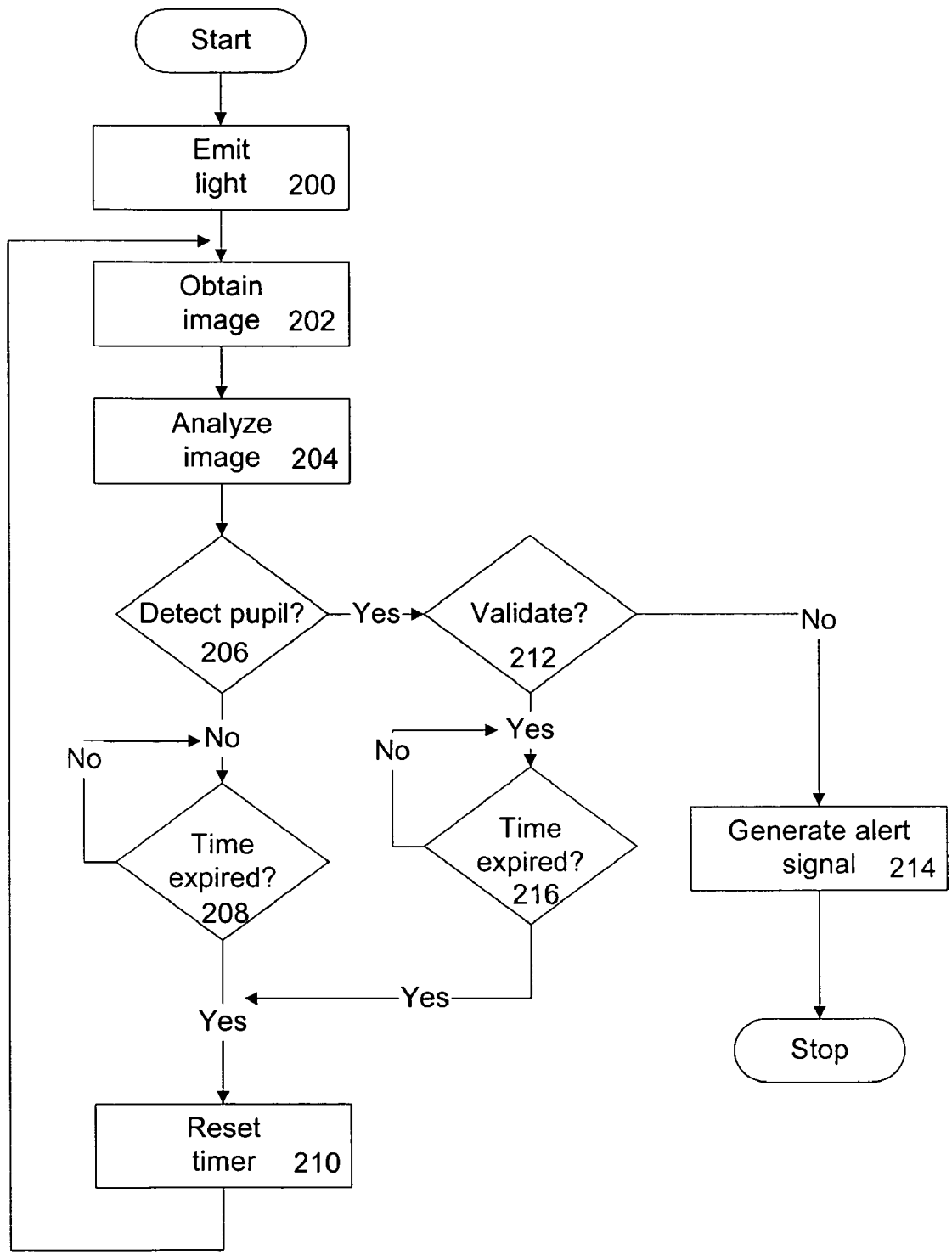
FIG. 2 is a flowchart of a method for pupil detection in an embodiment in accordance with the invention.

FIG. 2 is a flowchart of a method for pupil detection in an embodiment in accordance with the invention. Initially a light source emits light within a field of view, as shown in block 200. One or more images are then captured and the image or images analyzed (blocks 202, 204). The analysis includes generating a difference image in this embodiment in accordance with the invention. The difference image will be discussed in more detail in conjunction with FIGS. 3, 4 and 5.

A determination is made at block 206 as to whether a pupil (or pupils) has been detected. If a pupil has not been detected, a determination is then made at block 208 as to whether a specified period of time has expired. In some embodiments in accordance with the invention, the one or more images may be captured and analyzed on a continuous basis. In other embodiments in accordance with the invention, the one or more images may be captured and analyzed at regular intervals.

When the specified time period has expired, a timer is reset (block 210) and the process returns to block 202. The method continues through blocks 202 to 210 until, at block 206, a pupil (or pupils) is detected. When a pupil is detected, a determination is made at block 212 as to whether the pupil detection should be validated. If not, an alert signal is generated at block 214 and the process ends.

If the pupil detection should be validated, a determination is made as to whether a specified period of time has expired. When the specified time period has expired, the process continues at block 210 where a timer is reset. The method then returns to block 202 and continues until an alert signal is generated.

An alert signal may trigger, for example, an alarm system, floodlights, or video cameras. One or more video cameras may include pan, tilt, and zoom features to allow a security person to focus in on the subject, thereby allowing the user to better identify the subject. Pupil detection may be used independently or in combination with other features in a security system, such as, for example, motion detectors.

Figures 3, 4:
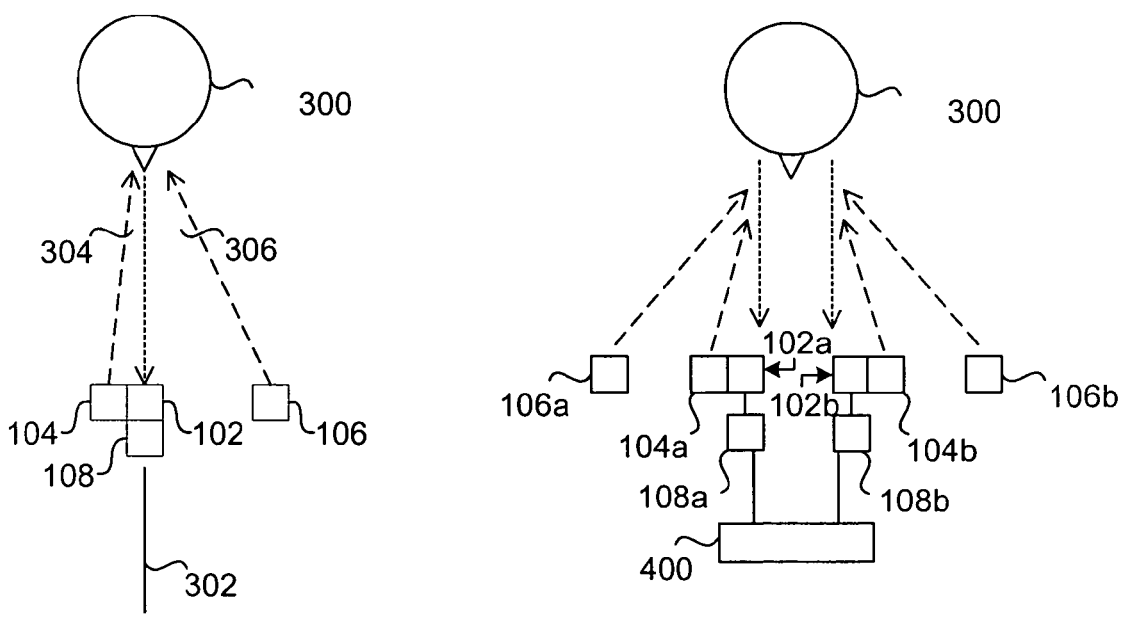
FIG. 3 is a diagram of a first application that uses pupil detection in an embodiment in accordance with the invention.
FIG. 4 is a diagram of a second application that uses pupil detection in an embodiment in accordance with the invention.

Referring now to FIG. 3, there is shown a diagram of a first application that uses pupil detection in an embodiment in accordance with the invention. The application may include, for example, a home security system monitoring a hallway or entranceway in the home. The system includes imager 102 and light sources 104, 106. Light sources 104, 106 emit light towards the face and/or eyes of subject 300. The eye or eyes reflects light that is captured by imager 102. In this embodiment for pupil detection, two images of the face and/or eyes (not shown) of subject 300 are captured using imager 102. One of the images is taken using light source 104, which is close to or on axis 302 of the imager 102 ("the on-axis light"). The second image is taken using light source 106 that is located at a larger angle away from axis 302 of the imager 102 ("the off-axis light"). When eyes of the subject 300 are open, the difference between the images highlights the pupils of the eyes. This is because specular reflection from the retina is detected only in the on-axis image. The diffuse reflections from other facial and environmental features are largely cancelled out, leaving the pupils as the dominant feature in the differential image.

Differential reflectivity off a retina of subject 300 is dependent upon the angle 304 between light source 104 and axis 302 of the imager 102, and the angle 306 between light source 106 and axis 302. In general, making angle 304 smaller will increase the retinal return. As used herein, "retinal return" refers to the light that is reflected off the back of the subject's 300 eye and detected at imager 102. "Retinal return" is also used to include reflection off other tissue at the back of the eye (other than or in addition to the retina). Accordingly, angle 304 is selected such that light source 104 is on or close to axis 302. In this embodiment in accordance with the invention, angle 304 is typically in the range from approximately zero to two degrees.

In general, the size of angle 306 is chosen so that only low retinal return from light source 106 will be detected at imager 102. The iris surrounding the pupil blocks this signal, and so pupil size under different lighting conditions should be considered when selecting the size of angle 306. In this embodiment in accordance with the invention, angle 306 is typically in the range from approximately three to fifteen degrees. In other embodiments in accordance with the invention, the size of angles 304, 306 may be different. For example, the field of view to be monitored, the distance at which the pupils should be detected, and the characteristics of a particular subject may determine the size of the angles 304, 306.

The images captured by imager 102 are processed and analyzed by controller 108. When one or both pupils of subject 300 are detected, controller 108 generates an alert signal, which is then transmitted to a controlled device (not shown).

Light sources 104, 106 are constructed in the same housing with detector 102 in this embodiment in accordance with the invention. In another embodiment in accordance with the invention, light sources 106 may be located in a housing separate from light sources 104 and detector 102. In yet another embodiment in accordance with the invention, light sources 104 may be located in a housing separate from detector 102 by placing a beam splitter between detector 102 and the object, which has the advantage of permitting a smaller effective on-axis angle of illumination.

FIG. 4 is a diagram of a second application that uses pupil detection in an embodiment in accordance with the invention. The system includes two detectors 102a, 102b, two on-axis light sources 104a, 104b, two off-axis light sources 106a,

106b, and two controllers 108a, 108b. The system generates a three-dimensional image of the eye or eyes of subject 300 by using two of the FIG. 3 systems in an epipolar stereo configuration. In this embodiment, the comparable rows of pixels in each detector 102a, 102b lie in the same plane. In other embodiments in accordance with the invention comparable rows of pixels do not lie in the same plane and adjustment values are generated to compensate for the row configurations.

Each controller 108a, 108b performs an independent analysis to detect in two-dimensions an eye or eyes of a subject 300. Stereo controller 400 uses the data generated by both controllers 108a, 108b to generate a three-dimensional image of the eye or eyes of subject 300. On-axis light sources 104a, 104b and off-axis light sources 106a, 106b may be positioned in any desired configuration. In some embodiments in accordance with the invention, an on-axis light source (e.g. 104b) may be used as the off-axis light source (e.g. 106a) for the opposite system.

FIG. 5a illustrates an image generated with an on-axis light source 104 in accordance with the embodiment of FIG. 3. Image 500 shows an eye that is open. The eye has a bright pupil due to a strong retinal return created by on-axis light source 104.

FIG. 5b depicts an image generated with off-axis light source 106 in accordance with the embodiment of FIG. 3. Image 502 in FIG. 5b may be taken at the same time as image 500, or it may be taken in an alternate frame (successively or non-successively) to image 500. Image 502 illustrates a normal, dark pupil.

FIG. 5c illustrates image 504 resulting from the difference between the FIG. 5a image and the FIG. 5b image. By taking the difference between images 500, 502, relatively bright spot 506 remains against relatively dark background 508 when the eye is open. There may be vestiges of other features of the eye remaining in the background 508. However, in general, bright spot 506 will stand out in comparison to background 508. When the eye is closed or nearly closed, there will not be bright spot 506 in the differential image.

FIGS. 5a-5c illustrate one eye of a subject. Those skilled in the art will appreciate that both eyes may be monitored as well. It will also be understood that a similar effect will be achieved if the images include other features of the subject (e.g. other facial features), as well as features of the subject's environment. These features will largely cancel out in a manner similar to that just described.

Referring now to FIG. 6, there is shown a diagram of a third application that utilizes pupil detection in an embodiment in accordance with the invention. In this embodiment an owner of building 600 wants to be alerted when a person approaches an entrance (not shown) to the building from street 602. One or more imagers 604 are used to detect light and generate images that are processed and analyzed by one or more controllers (not shown). Several light sources 606 emit light over a desired field of view 608. Those skilled in the art will appreciate that field of view 608, the number and type of imagers 604, and the number and type of light sources 606 are determined by the application. The distance at which an imager is first able to detect a pupil also influences the number and type of imagers 604 and light sources 606. Higher resolution imagers and a telescope with a large aperture are examples of two techniques that may be used to increase the distance at which a system first detects a pupil or pupils.

When a person approaches building 600, a controller (not shown) detects one or both pupils and responsively generates an alert signal. The alert signal may trigger, for example, an alarm, floodlights, or one or more video cameras. One or more video cameras may include pan, tilt, and zoom features to allow a security person to focus in on the subject, thereby allowing the user to better identify the subject. For example, a security person may be required to confirm the identity of the subject prior to allowing the subject to enter building 600.

Figure 7:
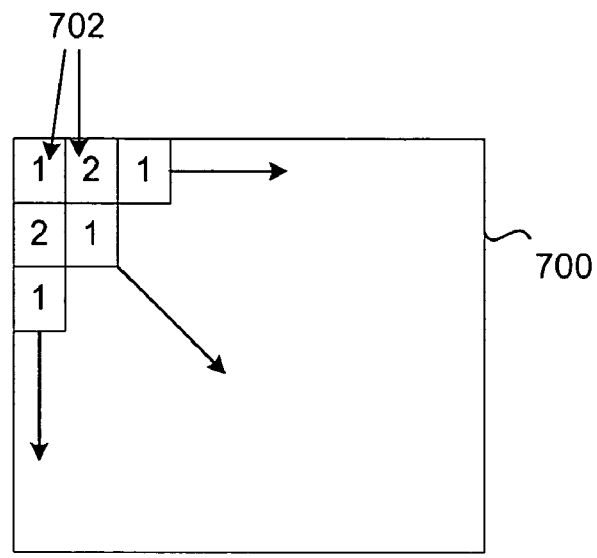
FIG. 7 depicts a sensor in an embodiment in accordance with the invention.

FIG. 7 depicts a sensor in an embodiment in accordance with the invention. In this embodiment, sensor 700 is incorporated into imager 102 (FIG. 1), and is configured as a complementary metal-oxide semiconductor (CMOS) imaging sensor. Sensor 700 may be implemented with other types of imaging devices in other embodiments in accordance with the invention, such as, for example, a charge-coupled device (CCD) imager.

Patterned filter layer 702 is formed on sensor 700 using different filter materials shaped into a checkerboard pattern. The two filters are determined by the wavelengths being used by light sources 104, 106. For example, in this embodiment in accordance with the invention, patterned filter layer 702 includes regions (identified as 1) that include a filter material for selecting the wavelength used by light source 104, while other regions (identified as 2) include a filter material for selecting the wavelength used by light source 106.

In the FIG. 7 embodiment, patterned filter layer 702 is deposited as a separate layer of sensor 700, such as, for example, on top of an underlying layer, using conventional deposition and photolithography processes while still in wafer form. In another embodiment in accordance with the invention, patterned filter layer 702 can be can be created as a separate element between sensor 700 and incident light. Additionally, the pattern of the filter materials can be configured in a pattern other than a checkerboard pattern. For example, patterned filter layer 702 can be formed into an interlaced striped or a non-symmetrical configuration (e.g. a 3-pixel by 2-pixel shape). Patterned filter layer 702 may also be incorporated with other functions, such as color imagers.

In other embodiments in accordance with the invention, patterned filter layer 702 may include blank regions (e.g. region 1) that do not cover selected areas of sensor 700 with a filter material. The uncovered regions of sensor 700 therefore receive the light from both light sources 104, 106. Since the covered regions pass light from only one light source and block light from the other light source, a gain factor is calculated and applied to the light passing through the covered regions. The gain factor compensates for the light absorbed by the filter material and for differences in sensor sensitivity between the two wavelengths.

Various types of filter materials can be used in patterned filter layer 702. In this embodiment in accordance with the invention, the filter materials include polymers doped with pigments or dyes. In other embodiments in accordance with the invention, the filter materials may include interference filters, reflective filters, and absorbing filters made of semiconductors, other inorganic materials, or organic materials.

Figure 8:
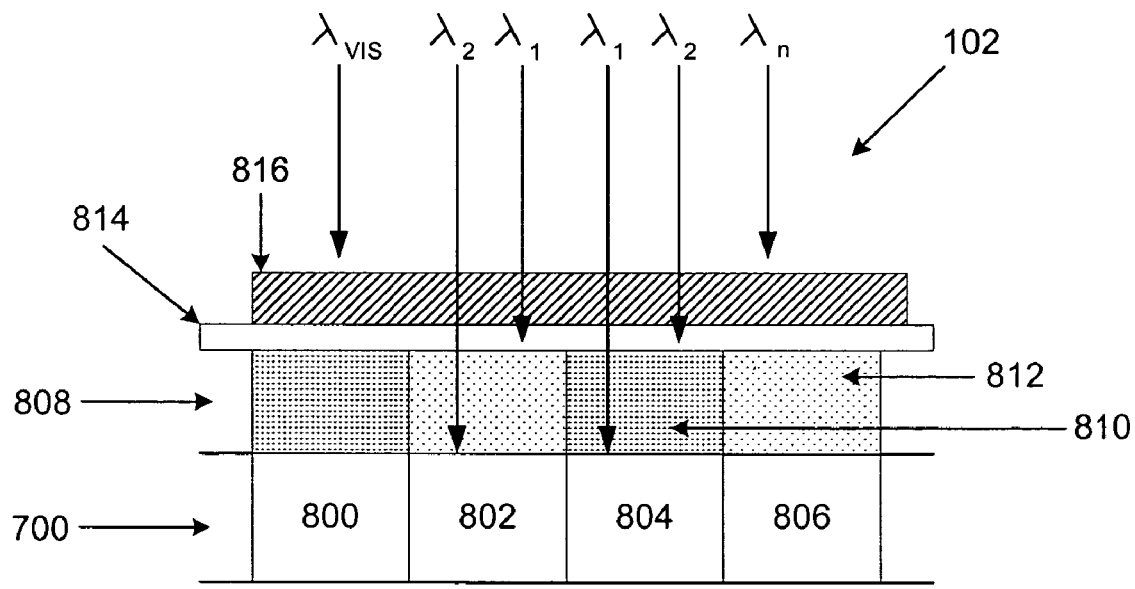
FIG. 8 is a cross-sectional diagram of an imager in an embodiment in accordance with the invention.

FIG. 8 is a cross-sectional diagram of an imager in an embodiment in accordance with the invention. Only a portion of imager 102 is shown in this figure. Imager 102 includes sensor 700 comprised of pixels 800, 802, 804, 806, patterned filter layer 808 including two alternating filter regions 810, 812, glass cover 814, and dual-band narrowband filter 816. Sensor 700 is configured as a CMOS imager and patterned filter layer 808 as two polymers 810, 812 doped with pigments or dyes in this embodiment in accordance with the invention. Each region in patterned filter layer 808 (e.g. a square in the checkerboard pattern) overlies a pixel in the CMOS imager.

Narrowband filter 816 and patterned filter layer 808 form a hybrid filter in this embodiment in accordance with the invention. When light strikes narrowband filter 816, the light at wavelengths other than the wavelengths of light source 104 ($\lambda_1$) and light source 106 ($\lambda_2$) are filtered out, or blocked, from passing through the narrowband filter 816. Thus, the light at visible wavelengths $\lambda_{VIS}$ and at wavelengths ($\lambda_n$) are filtered out in this embodiment, while the light at or near wavelengths $\lambda_1$ and $\lambda_2$ transmit through the narrowband filter 816. Thus, only light at or near the wavelengths $\lambda_1$ and $\lambda_2$ passes through glass cover 814. Thereafter, polymer 810 transmits the light at wavelength $\lambda_1$ while blocking the light at wavelength $\lambda_2$. Consequently, pixels 800 and 804 receive only the light at wavelength $\lambda_1$, thereby generating the image taken with the on-axis light source 104.

Polymer 812 transmits the light at wavelength $\lambda_2$ while blocking the light at wavelength $\lambda_1$, so that pixels 802 and 806 receive only the light at wavelength $\lambda_2$. In this manner, the image taken with off-axis light source 106 is generated. The shorter wavelength $\lambda_1$ is associated with on-axis light source 104, and the longer wavelength $\lambda_2$ with off-axis light source 106 in this embodiment in accordance with the invention. The shorter wavelength $\lambda_1$, however, may be associated with off-axis light source 106 and the longer wavelength $\lambda_2$ with on-axis light source 104 in other embodiments in accordance with the invention.

Narrowband filter 816 is a dielectric stack filter in this embodiment in accordance with the invention. Dielectric stack filters are designed to have particular spectral properties. In this embodiment in accordance with the invention, the dielectric stack filter is formed as a dual-band narrowband filter. Narrowband filter 816 is designed to have one peak at $\lambda_1$ and another peak at $\lambda_2$. Therefore, only the light at or near wavelengths $\lambda_1$ and $\lambda_2$ strikes polymer filters 810, 812 in patterned filter layer 808. Patterned filter layer 808 is then used to discriminate between $\lambda_1$ and $\lambda_2$. Wavelength $\lambda_1$ is transmitted through filter 810 (and not through filter 812), while wavelength $\lambda_2$ is transmitted through filter 812 (and not through filter 810).

Those skilled in the art will appreciate patterned filter layer 808 provides a mechanism for selecting channels at pixel spatial resolution. In this embodiment in accordance with the invention, channel one is associated with the on-axis image and channel two with the off-axis image. In other embodiments in accordance with the invention, channel one may be associated with the off-axis image and channel two with the on-axis image.

Sensor 700 sits in a carrier (not shown) in this embodiment in accordance with the invention. Glass cover 814 typically protects sensor 700 from damage and particle contamination (e.g. dust). Glass cover 814 is formed as a colored glass filter in this embodiment, and is included as the substrate of the dielectric stack filter (i.e., narrowband filter 816). The colored glass filter is designed to have certain spectral properties, and is doped with pigments or dyes. Schott Optical Glass Inc., a company located in Mainz, Germany, is one company that manufactures colored glass that can be used in colored glass filters.

Figure 9:
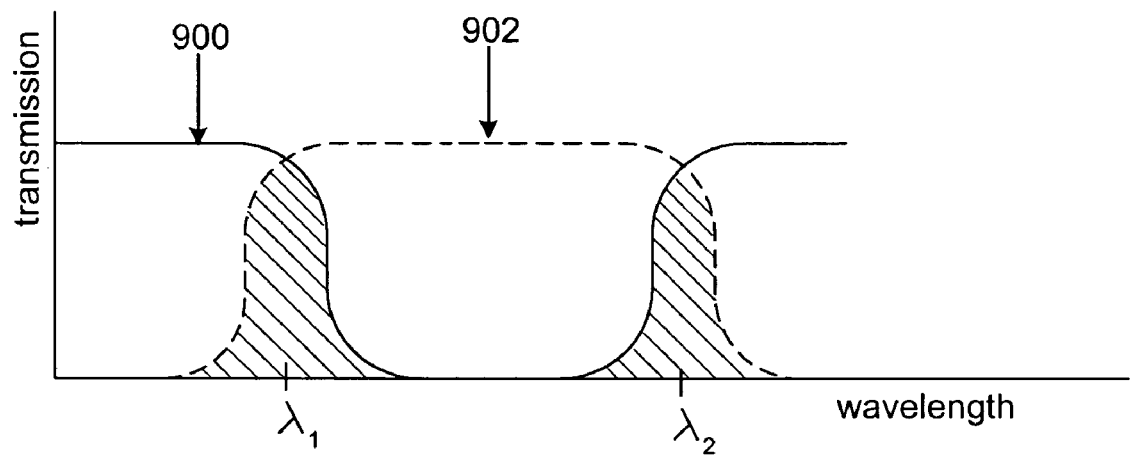
FIG. 9 illustrates a first method for fabricating a dual-band narrowband filter in an embodiment in accordance with the invention.

Referring now to FIG. 9, there is shown a first method for fabricating a dual-band narrowband filter in an embodiment in accordance with the invention. As discussed in conjunction with the FIG. 8 embodiment, narrowband filter 816 is a dielectric stack filter that is formed as a dual-band narrowband filter. Dielectric stack filters can include any combination of filter types. The desired spectral properties of the completed dielectric stack filter determine which types of filters are included in the layers of the stack.

Figure 10:
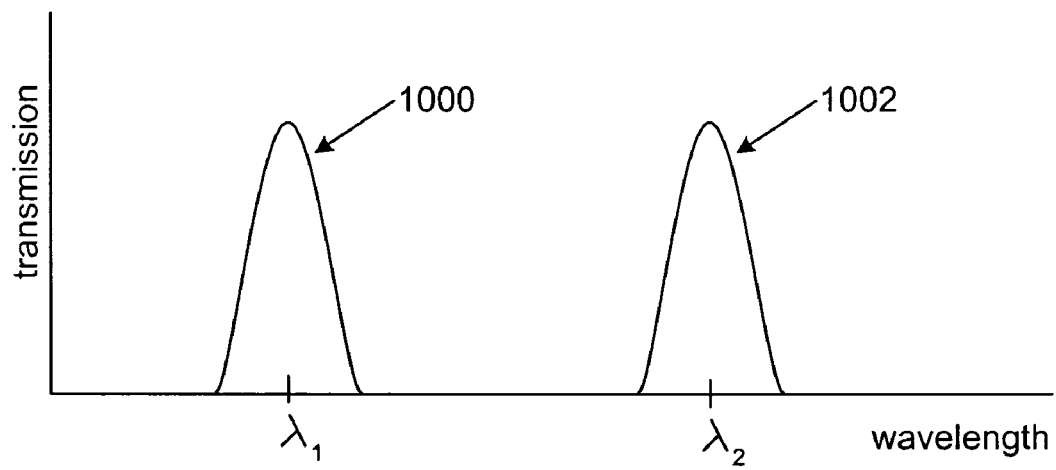
FIG. 10 depicts the spectrum for the dual-band narrowband filter of FIG. 9.

For example, a filter can be fabricated by combining two filters 900, 902. Band-blocking filter 900 filters out the light at wavelengths between the regions around wavelengths $\lambda_1$ and $\lambda_2$, while bandpass filter 902 transmits light near and between wavelengths $\lambda_1$ and $\lambda_2$. The combination of filters 900, 902 transmits light in the hatched areas, while blocking light at all other wavelengths. FIG. 10 depicts the spectrum for the dual-band narrowband filter of FIG. 9. As can be seen, light transmits through the combined filters only at or near the wavelengths of interest, $\lambda_1$ (spectrum 1000) and $\lambda_2$ (spectrum 1002).

Figure 11:
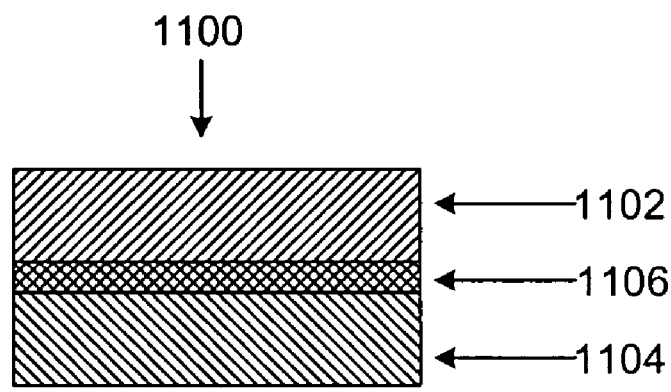
FIG. 11 illustrates a Fabry-Perot (FP) resonator used in a second method for fabricating a dual-band narrowband filter in an embodiment in accordance with the invention.

A dual-band narrowband filter can also be fabricated by stacking coupled-cavity resonators on top of each other, where each coupled-cavity resonator is formed with two Fabry-Perot resonators. FIG. 11 illustrates a Fabry-Perot (FP) resonator used in a second method for fabricating a dual-band narrowband filter in an embodiment in accordance with the invention. Resonator 1100 includes upper Distributed Bragg reflector (DBR) 1102 layer and lower DBR layer 1104. The materials that form the DBR layers include N pairs of quarter-wavelength (m$\lambda$/4) thick low index material and quarter-wavelength (n$\lambda$/4) thick high index material, where the variable N is an integer number and the variables m and n are odd integer numbers. The wavelength is defined as the wavelength of light in a layer, which is equal to the freespace wavelength divided by the layer index of refraction.

Figure 12:
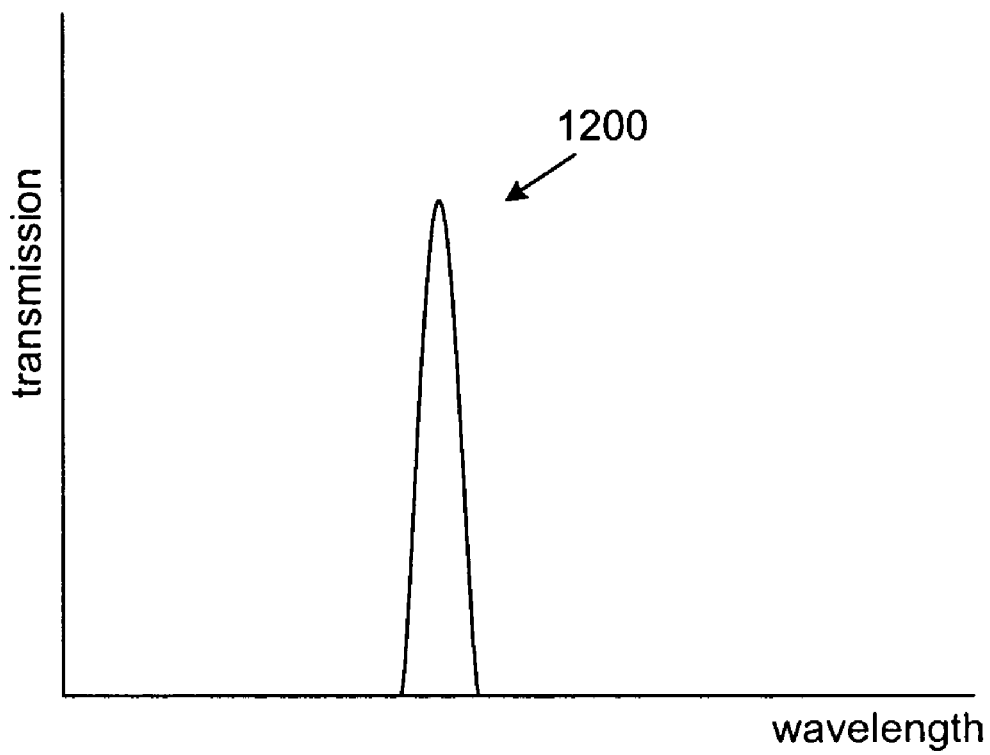
FIG. 12 depicts the spectrum for the Fabry-Perot resonator of FIG. 11.

Cavity 1106 separates the two DBR layers 1102, 1104. Cavity 1106 is configured as a half-wavelength (p$\lambda$/2) thick cavity, where p is an integer number. The thickness of cavity 1106 and the materials in DBR layers 1102, 1104 determine the transmission peak for FP resonator 1100. FIG. 12 depicts the spectrum for the Fabry-Perot resonator of FIG. 11. FP resonator 1100 has a single transmission peak 1200.

Figure 13:
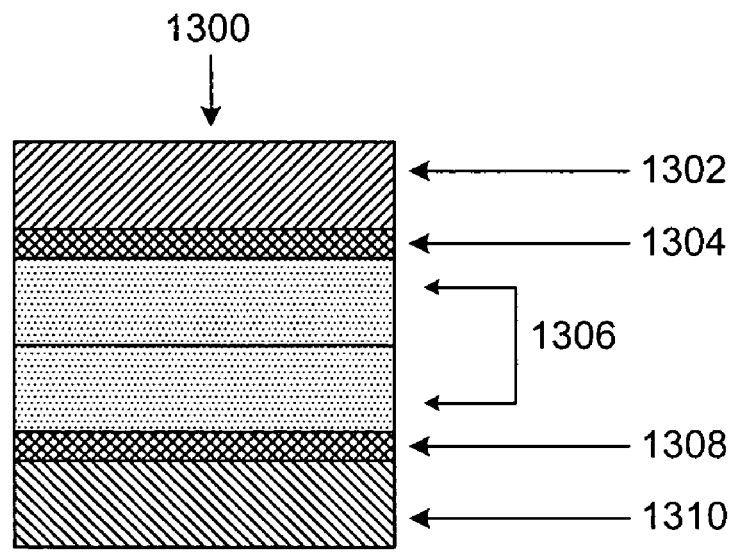
FIG. 13 depicts a coupled-cavity resonator used in the second method for fabricating a dual-band narrowband filter in an embodiment in accordance with the invention.

In this second method for fabricating a dual-band narrowband filter, two FP resonators 1100 are stacked together to create a coupled-cavity resonator. FIG. 13 depicts a coupled-cavity resonator used in the second method for fabricating a dual-band narrowband filter in an embodiment in accordance with the invention. Coupled-cavity resonator 1300 includes upper DBR layer 1302, cavity 1304, strong-coupling DBR 1306, cavity 1308, and lower DBR layer 1310. The strong-coupling DBR 1306 is formed when the lower DBR layer of top FP resonator (i.e., layer 1104) merges with an upper DBR layer of bottom FP resonator (i.e., layer 1102).

Figure 14:
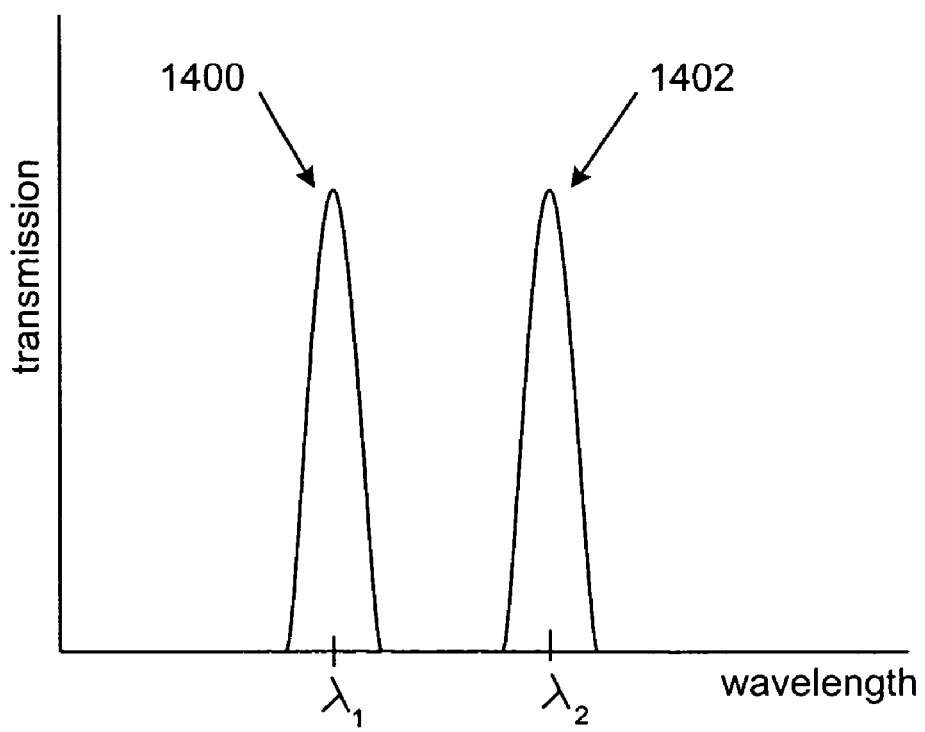
FIG. 14 depicts the spectrum for the coupled-cavity resonator of FIG. 13.

Stacking two FP resonators together splits the single transmission peak 1200 in FIG. 12 into two peaks, as shown in FIG. 14. The number of pairs of quarter-wavelength thick index materials in strong-coupling DBR 1306 determines the coupling strength between cavities 1304, 1308. And the coupling strength between cavities 1304, 1308 controls the spacing between peak 1400 and peak 1502.

Figure 15:
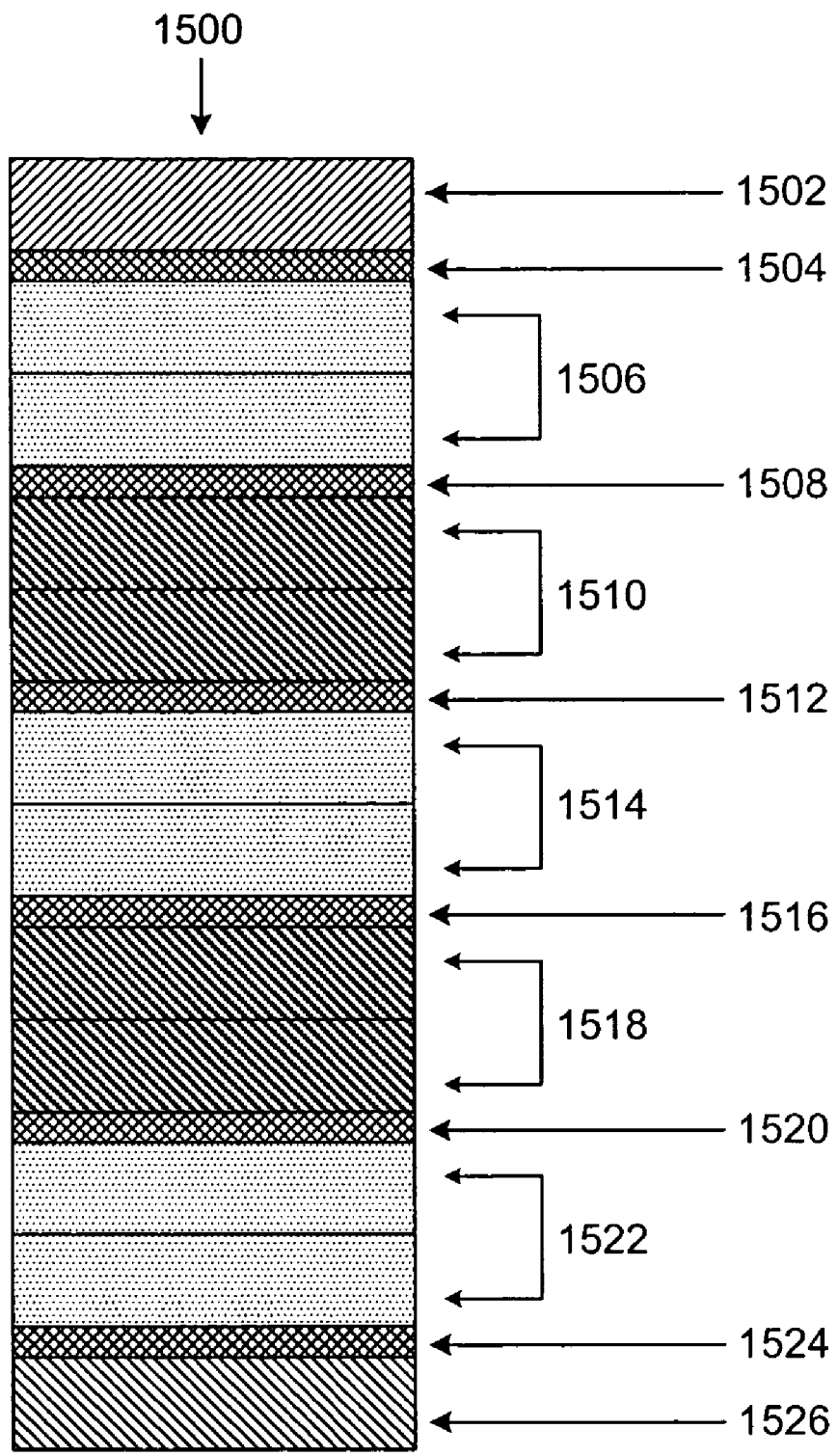
FIG. 15 illustrates a stack of three coupled-cavity resonators that form a dual-band narrowband filter in an embodiment in accordance with the invention.

FIG. 15 illustrates a stack of three coupled-cavity resonators that form a dual-band narrowband filter in an embodiment in accordance with the invention. Dual-band narrowband filter 1500 includes upper DBR layer 1502, cavity 1504, strong-coupling DBR 1506, cavity 1508, weak-coupling DBR 1510, cavity 1512, strong-coupling DBR 1514, cavity 1516, weak-coupling DBR 1518, cavity 1520, strong-coupling DBR 1522, cavity 1524, and lower DBR layer 1526.

Figure 16:
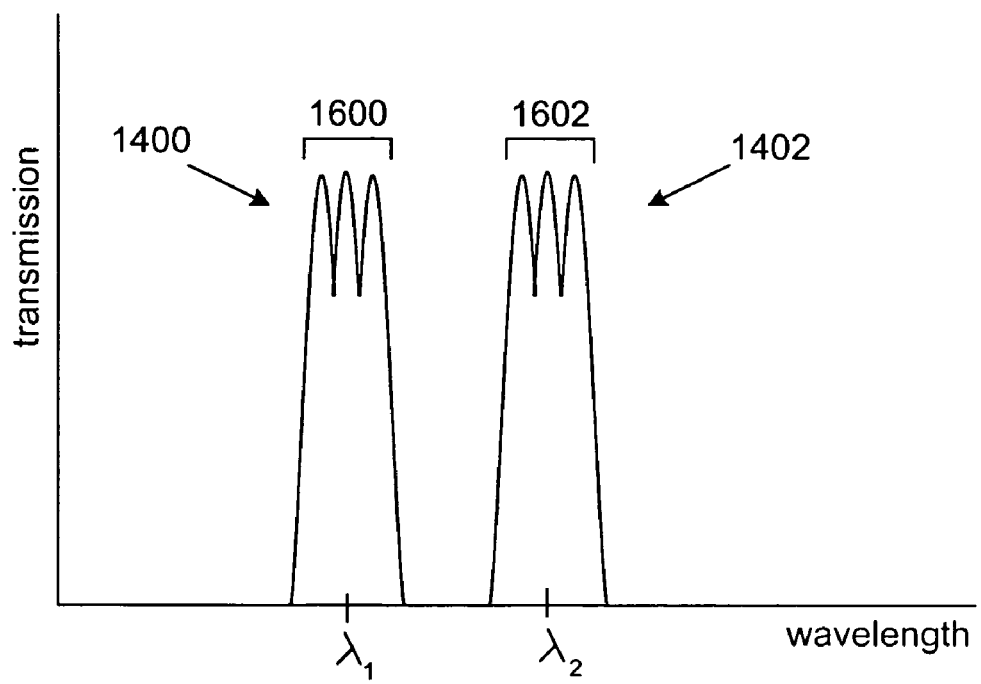
FIG. 16 depicts the spectrum for the dual-band narrowband filter of FIG. 14.

Stacking three coupled-cavity resonators together splits each of the two peaks 1400, 1402 into a triplet of peaks 1600, 1602, respectively. FIG. 16 depicts the spectrum for the dual-band narrowband filter of FIG. 15. The strength of the coupling in weak-coupling DBRs 1510, 1518 is reduced by increasing the number of mirror pairs in coupling DBRs 1510, 1518. The reduced coupling strength merges each triplet of peaks 1600, 1602 into a single broad, fairly flat transmission band. Changing the number of pairs of quarter-wavelength thick index materials in weak-coupling DBRs 1510, 1518 alters the spacing within the triplet of peaks 1600, 1602.

Figure 17:
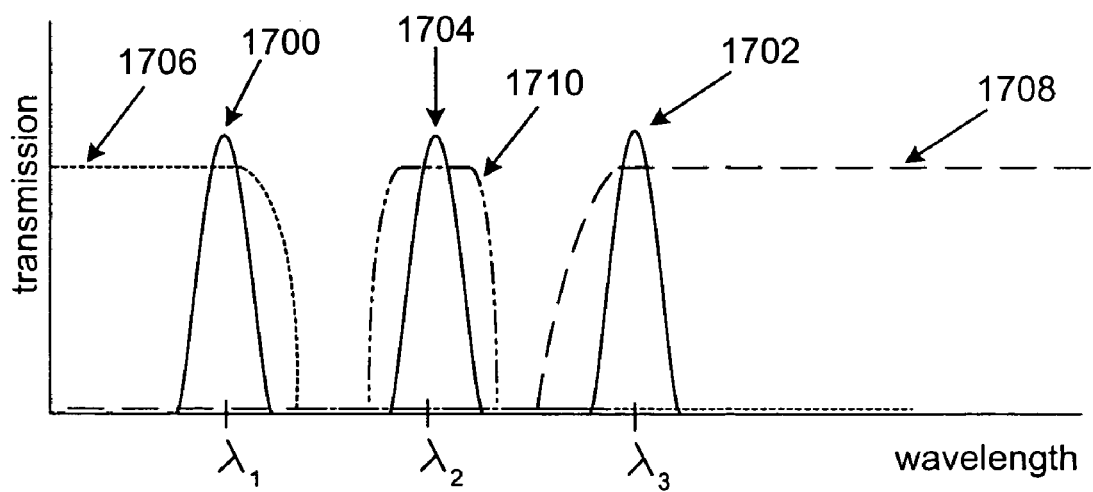
FIG. 17 illustrates spectra for polymer filters and a tri-band narrowband filter in an embodiment in accordance with the invention.

Although a hybrid filter has been described with reference to detecting light at two wavelengths, $\lambda_1$ and $\lambda_2$, hybrid filters in other embodiments in accordance with the invention may be used to detect more than two wavelengths of interest. FIG. 17 illustrates spectra for polymer filters and a tri-band narrowband filter in an embodiment in accordance with the invention. A hybrid filter in this embodiment detects light at three wavelengths of interest, $\lambda_1$, $\lambda_2$, and $\lambda_3$. Spectra 1700 and 1702 at wavelengths $\lambda_1$ and $\lambda_3$, respectively, represent two signals to be utilized by an imaging system. Light detected at wavelength $\lambda_2$ (spectrum 1704) is used to determine the amount of light received by the imaging system outside the two wavelengths of interest. The amount of light detected at wavelength $\lambda_2$ may be used as a reference amount of light detectable by the imaging system.

A tri-band narrowband filter transmits light at or near the wavelengths of interest ($\lambda_1$, $\lambda_2$, and $\lambda_3$) while blocking the transmission of light at all other wavelengths in this embodiment in accordance with the invention. Polymer filters in a patterned filter layer then discriminate between the light received at wavelengths $\lambda_1$ $\lambda_2$, and $\lambda_3$.

Figure 18:
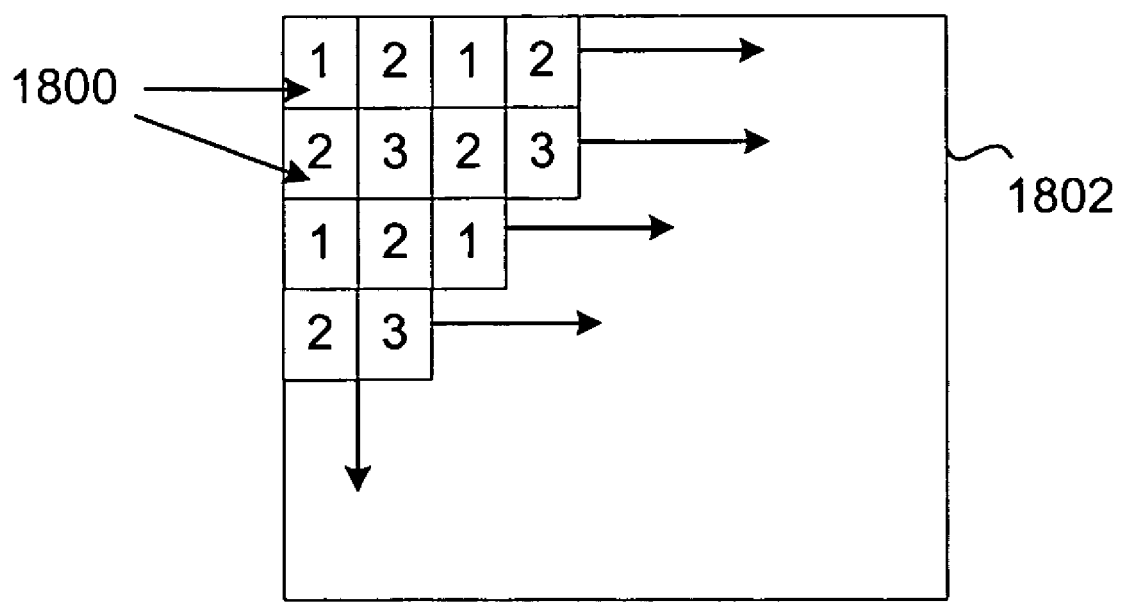
FIG. 18 depicts a sensor in accordance with the embodiment shown in FIG. 17.

FIG. 18 depicts a sensor in accordance with the embodiment shown in FIG. 17. Patterned filter layer 1800 is formed on sensor 1802 using three different filters. In this embodiment, one region in patterned filter layer (e.g. region 1) transmits the light at wavelength $\lambda_1$ while blocking the light at wavelengths $\lambda_2$ and $\lambda_3$ (see spectrum 1706 in FIG. 17). Another region in patterned filter layer (e.g. region 3) transmits the light at wavelength $\lambda_3$ while blocking the light at wavelengths $\lambda_1$ and $\lambda_2$ (see spectrum 1708 in FIG. 17). The third region transmits light at wavelength $\lambda_2$ while blocking the light at wavelengths $\lambda_1$ and $\lambda_3$ (see spectrum 1710 in FIG. 17).

The invention claimed is:

1. A system for pupil detection, comprising:
   a source for emitting light towards an object;
   a first imager;
   a first hybrid filter positioned between the source and the first imager; and
   a first controller connected to the first imager for generating an alert signal when a pupil is detected, wherein detection of the pupil indicates detection of a person moving into a field of view of the imager.

2. The system of claim 1, further comprising:
   a second imager;
   a second hybrid filter positioned between the second imager and the source;
   a second controller connected to the second imager; and
   a stereo controller connected to the first and second controllers for generating at least one three-dimensional image.

3. The system of claim 1, further comprising a timer connected to the controller.

4. The system of claim 1, further comprising a controlled device connected to the first controller.

5. The system of claim 1, further comprising an input device connected to the first controller, wherein the input device is implemented as a computer operating pursuant to a security program and is configured to alter a parameter of the first controller.

6. The system of claim 1, wherein the first imager generates the one or more images continuously and the first controller continuously analyzes the one or more images.

7. The system of claim 1, wherein the first imager includes a light-detecting sensor.

8. The system of claim 7, wherein the light-detecting sensor simultaneously detects the amount of light received at or near the multiple wavelengths of interest.

9. The system of claim 7, wherein the light-detecting sensor alternately detects the amount of light received at or near each wavelength of interest.

10. The system of claim 1, wherein the hybrid filter comprises a first filter layer and a patterned filter layer, wherein the first filter layer passes light at or near the multiple wavelengths of interest and blocks light at all other wavelengths, and wherein the patterned filter layer includes regions that transmit light received at or near one wavelength of interest and block light received at or near the other wavelengths of interest.

11. The system of claim 10, wherein the patterned filter layer includes regions that do not block any light and receive light at or near all of the wavelengths of interest.

12. The system of claim 10, wherein the first filter layer comprises a dielectric stack filter.

13. The system of claim 12, wherein the dielectric stack filter comprises a colored glass filter.

14. The system of claim 12, wherein the dielectric stack filter comprises N coupled-cavity resonators stacked together, where N is an integer number.

15. The system of claim 10, wherein the patterned filter layer is comprised of one of patterned dye-doped polymers, patterned pigment-doped polymers, patterned interference filters, patterned reflective filters, or patterned absorbing filters.

16. The system of claim 1, wherein the source comprises a single broadband light source emitting light at the multiple wavelengths of interest.

17. The imaging system of claim 1, wherein the source comprises a first light source emitting light at the first wavelength and a second light source emitting light at the second wavelength.

18. The imaging system of claim 17, wherein the first light source is positioned at a first angle relative to the axis of the light-detecting sensor and the second light source is positioned at a second angle relative to the axis of the light-detecting sensor where the second angle is larger than the first angle.

19. A method for wavelength-dependent detection, comprising:
   receiving light from an object, wherein the light includes light propagating at two or more wavelengths of interest;

discriminating between light received at or near the wavelengths of interest while simultaneously blocking light received at all other wavelengths;
detecting the amount of light received at or near each wavelength of interest and generating one or more images using the light received at or near the wavelengths of interest;
determining whether at least one of the one or more images includes a pupil; and
generating an alert signal when at least one of the images includes a pupil, wherein detection of the pupil indicates detection of a person moving into a field of view of the imager.

20. The method of claim 19, further comprising determining a difference between the amount of light received at each of the wavelengths of interest.

21. The method of claim 19, wherein determining whether at least one of the one or more images includes a pupil comprises continuously determining whether at least one of the one or more images includes a pupil.

22. The method of claim 19, wherein determining whether at least one of the one or more images includes a pupil comprises determining at regular intervals whether at least one of the one or more images includes a pupil.

* * * * *